United States Patent [19]

Duyvesteyn et al.

[11] Patent Number: 5,626,648
[45] Date of Patent: May 6, 1997

[54] RECOVERY OF NICKEL FROM BIOLEACH SOLUTION

[75] Inventors: Willem P. C. Duyvesteyn; Matt Omofoma, both of Reno, Nev.

[73] Assignee: BHP Minerals International Inc., Reno, Nev.

[21] Appl. No.: 503,130

[22] Filed: Jul. 17, 1995

[51] Int. Cl.$^6$ .................................................. C22B 3/18
[52] U.S. Cl. ............................. 75/712; 75/743; 423/139; 423/DIG. 17
[58] Field of Search ................... 423/139, DIG. 17; 75/712, 743

[56] References Cited

U.S. PATENT DOCUMENTS

| | | | |
|---|---|---|---|
| 4,401,629 | 8/1983 | Hancock et al. | 423/139 |
| 5,429,659 | 7/1995 | Spencer et al. | 423/DIG. 17 |
| 5,491,078 | 2/1996 | Clark | 423/68 |

*Primary Examiner*—Melvyn Andrews
*Attorney, Agent, or Firm*—Hopgood, Calimafde, Kalil & Judlowe

[57] ABSTRACT

A bioleaching method is provided for recovering nickel from an ore selected from the group consisting nickel-containing lateritic ores and nickel-containing sulfidic ores or concentrates thereof. Where the ore selected is a nickel-containing lateritic ore, at least one micro-organism selective to the leaching of the lateritic ore is provided as an aqueous solution thereof maintained at a pH ranging from about 1 to 3 including a nutrient for the micro-organism. The ore may be in the form of a heap, or a charge in a vat, or as a slurry. Where the ore selected is a nickel-containing sulfidic ore or concentrate thereof, at least one micro-organism comprising a biooxidizing bacterium selective to the leaching of sulfidic ore is added as an aqueous solution to the sulfidic ore or concentrate maintained at a pH of about 1 to 3, including a nutrient for the bacterium. The ore either as a slurry, a heap, or a charge in a vat is bioleached for a time sufficient to effect the dissolution of the nickel in the ore and form a solution thereof and a residue which is separated from the solution. The nickel is then selectively extracted from the solution using an ion exchange resin, and the nickel thereafter extracted from the resin using a mineral acid.

14 Claims, No Drawings

RECOVERY OF NICKEL FROM BIOLEACH SOLUTION

This invention relates to the recovery of nickel from solutions generated from the processing of nickeliferrous oxide or sulfide ores by bioleaching.

BACKGROUND OF THE INVENTION

It is known to recover nickel and/or copper from sulfidic ores by comminuting the ore to a finely divided state, subjecting the comminuted ore to froth flotation to upgrade the metal content thereof, and roasting the concentrate in an oxidizing atmosphere to remove the sulfur therefrom as $SO_2$, followed by the reduction of the oxidized concentrate at an elevated temperature with a carbonaceous material to form molten nickel which is cast to provide pig nickel for use in the manufacture of stainless steel.

The foregoing method has certain disadvantages particularly with respect to the formation of $SO_2$ which is undesirable. Unless the $SO_2$ is converted to sulfuric acid on site, the $SO_2$ effluent released into the atmosphere presents environmental problems.

Nickel-containing sulfidic minerals and laterites are the two major raw material sources for nickel. The laterites are abundantly distributed throughout the world.

However, laterites unlike nickel sulfide ores, cannot be concentrated by froth flotation or magnetically. Compared to other ores, the nickel content is low, for example, may range from 0.5 to 1.5% nickel by weight, with the exception of deposits in New Caledonia and Indonesia in which the amount of nickel is of the order of up to about 3% by weight which is quite high.

It has been predicted that by the end of this century, laterites will become the major source for the production of nickel.

The conventional process for recovering nickel from lateritic ores is somewhat energy intensive in that the nickel is extracted from the ore by high pressure leaching at elevated temperature in an autoclave.

For example, one process for recovering nickel and cobalt from lateritic ores is the well known Moa Bay process involving acid leaching at elevated temperatures and pressures at which iron oxide and aluminum oxysulfate are substantially insoluble.

In the Moa Bay process, lateritic ore at minus 20 mesh (95% passing 325 mesh U.S. Standard) is pulped to approximately 45% solids and the nickel and cobalt selectively leached with sufficient sulfuric acid at elevated temperature and pressure (e.g. 230° C. to 250° C. and 405 to 580 psia) to solubilize about 95% each of nickel and cobalt in about 60 to 90 minutes. After pressure let down, the leached pulp is washed by countercurrent decantation with the washed pulp going to tailings. The leach solution pH, which is quite low (e.g., between 0 and 0.5), is then neutralized with coral mud to a pH of about 2.4 in a series of four tanks at a total retention time of about 20 minutes and the thus-treated product liquor (containing about 5.65 gpl Ni, 0.8 gpl Fe and 2.3 gpl Al), after solid-liquid separation, is then subjected to sulfide precipitation. The leach liquor is preheated and the sulfide precipitation carried out using $H_2S$ as the precipitating reagent in an autoclave at about 120° C. (250° F.) and a pressure of about 150 psig.

In the original scheme for treating the mixed sulfides, the sulfide precipitate was washed and thickened to a solids content of 65%. It was then oxidized in an autoclave at about 177° C. (350° F.) and a pressure of about 700 psig.

The solution containing nickel and cobalt was then neutralized with ammonia to a pH (5.35) sufficient to precipitate any residual iron, aluminum, and chromium present using air as an oxidizing agent.

The precipitate was thereafter separated from the solution and the nickel and cobalt solution then adjusted to a pH of about 1.5. $H_2S$ was added to precipitate selectively any copper, lead and zinc present. The precipitate was separated from the solution by filtration and the nickel recovered by various methods. One method comprised treating the nickel-containing solution with hydrogen at elevated temperature and pressure to produce nickel powder.

The aforementioned method, as stated hereinbefore, had certain economic disadvantages. The conversion of mixed nickel-cobalt sulfide into salable separate nickel and cobalt products was very expensive and there was no market for mixed sulfide precipitates.

It is known to subject gold-bearing sulfide ore to oxidative bioleaching. Such methods are disclosed in U.S. Pat. No. 4,729,788, No. 5,127,942 and No. 5,244,493. The sulfidic material is ground, placed in heaps or piles or pulped or slurried and bioleached to oxidize the sulfide mineral using bacteria at temperatures of about 15° C. to about 40° C. The sulfide particle containing gold occluded within it is biooxidized to physically free up the gold for removal by cyanide leaching or other types of leaching.

Attempts to use bioleaching to recover base metals, such as nickel, have not been attractive enough to warrant the building of a commercial plant, particularly since technology was not in place economically at the time for recovering nickel from the solution which were quite dilute at best, except for the use of solvent extraction by means of which more concentrated solutions could be produced for the subsequent recovery of nickel. The recovery of nickel from low grade bioleach solutions by solvent extraction has its problems in that (i) there are organic solvents that preferentially extract nickel from mixed ferric iron-nickel containing solutions such as shown hereinafter in Example 2 and (ii) the micro-organisms present in the bioleach solutions tend to adversely affect the separation of the organic phase from the aqueous phase.

The problem with ferric iron is that either the ferric ion will preferentially load on organic solvents, such as DEPHA (di-2-ethyl hexyl phosphoric acid) or it will oxidize the active ingredient in organic solvents such as Cyanex 272; 301 and 302. These reagents are sold by the American Cyanamid Company with the following active ingredients: phosphoric, phosphonic and phosphinic acids.

"Third phase" formation during solvent extractions sometimes limits the application of solvent extraction in leaching operations, particularly in a bioleaching circuit because bacteria and organic solvents are not compatible. For example, *Thiobacillus ferroxidans* is in essence a sulfur-loving bacteria which presents problems in solvent extraction, particularly when the organic solvent contains sulfur, such as in di-nonyl-naphthyl sulfonic acid. Since many nickel sulfide ore bodies have a metal cut-off grade of around 0.2% to 0.5% Ni, it at once becomes apparent that a method is needed to enable the production of nickel solutions of sufficiently high concentration from which the nickel can be recovered economically. Thus, low grade nickel ores, in essence, could then be treated the same as a high grade ore with the same economical advantages.

Recent work conducted in the bioleaching of ores has indicated that low grade ores can be economically leached using bacteria as a means for effecting the dissolution of metal, e.g., nickel and/or cobalt, into an aqueous acid solution.

An advantage of bioleaching, while time dependent, is the fact that it is not energy and cost intensive. The pregnant solution obtained, however, is quite dilute.

One bioleaching method proposed for the recovery of nickel from sulfide ores is disclosed in Canadian Patent No. 2,065,491 which issued on Oct. 9, 1992.

According to the Canadian patent, a method disclosed comprises crushing the sulfide ore which is thereafter formed into a heap and the ore heap percolated with an iron sulfate solution which, optionally, carries bacteria, such as *Thiobacillus ferroxidans, Thiobacillus thiooxidans* or *Leptospirillum ferroxidans*. By virtue of the oxidation of the sulfide ore, the generation of sulfuric acid occurs, thus forming a sulfate solution.

Sulfuric acid or an alkali, such as lime, is added to the solution, if necessary, to control the pH to a range of about 1.2 to 3, preferably from 2.3 to 2.5.

An anaerobic bacterium is added to the sulfate solution to cause the precipitation of the dissolved metal as an insoluble sulfide, thus upgrading the metal into a highly concentrated form which then must be treated to recover the metal, e.g., nickel.

To bring about sulfide generation of the dissolved metal (e.g., nickel), a bacterium, referred to as Desulforvivrio Desulfuricans, may be added to the solution. After the nickel sulfide precipitates, it is separated from the solution to provide a concentrate high in nickel which must be further treated, such as by high pressure leaching at an elevated temperature in the presence of sulfuric acid to produce a nickel sulfate solution from which the nickel is extracted by known conventional methods.

In a paper entitled "The Solubilization of Nickel, Cobalt and Iron From Laterites by Means of Organic Chelating agents" (Denis I. McKenzie et al, International Journal of Mineral Processing' 21 (1987) P.275–292), a group of carboxylic acids were mentioned as chelating agents, including Oxalic Acid, Citric Acid, Tartaric Acid, among others. The efficacy of the organic acids at natural pH were compared to $H_2SO_4$ (15 mM final concentration). Over a 456 hour period, using 15 mM concentrations of acids with 2 grams of ore (West Australian ore) in 150 ml of $H_2O$, Oxalic, Citric and Tartaric acids compared somewhat favorably with $H_2SO_4$. Amount of nickel dissolved in ppm was 30.3 for $H_2SO_4$, 18.5 for Oxalic acid, 20.2 for Citric acid and 16.3 for Tartaric.

The same acids employed on Indonesian ore showed that the nickel dissolved amounted to the following: Citric Acid 863 ppm, Tartaric Acid—708 ppm, Oxalic Acid—318 ppm, etc.

In a paper entitled "Microbial Leaching of Nickel from Low Grade Greek Laterites," *Mineral Bioprocessing*, TMS, 1991 page 191–205, the authors indicate a variety of heterotrophic micro-organisms that can produce such organic acids. They include: asperigillus and penicillia concentrations of around 40 grams of organic acid which were readily produced by these microorganisms.

Close to 70% of the Ni and less than 5% of the Fe were solubilized after a 51-day leaching period from a laterite ore containing about 1% Ni and 30% Fe. This work also showed an improved extraction when the organisms plus the culture medium were mixed with the laterite ore. An explanation was given: "Once the organisms attach themselves to the surface of the mineral grains, a high metal concentration gradient is experienced which could be toxic to the organisms spurring them to produce more citric acid (possibly as a defense response) which subsequently leaches out more ions from the mineral grains." If the toxic metal were to be removed from the solution, as proposed in accordance with the present invention, either during the leaching process or interrupted by it, the leaching kinetics will be enhanced significantly so long as a low level of the toxic metal is maintained.

One method of heap leaching with nutrient solutions containing at least one micro-organisms include those selected from the group consisting of the fungi *Aspergillus Niger*, Penicillium Sp., Aspergillus Sp., *Penicillium Simplicissimus* and the bacteria Enterobacter Spp., Bacillus Spp., and Achromobacter Spp.

It would be desirable to provide a process for bioleaching relatively low grade as well as relative high grade nickel-containing lateritic ores and sulfidic ores or concentrates thereof in combination with a novel method for concentrating the nickel ions in solution from which nickel is economically recovered.

OBJECTS OF THE INVENTION

It is an object of the invention to provide a bioleaching process for the direct production of nickel metal by treating nickel-containing lateritic ores or nickel-containing sulfide ores or concentrates thereof (hereinafter referred to as nickel-containing sulfidic material) without going through an intermediate nickel sulfide production stage.

Another object is to provide a bioleaching process for treating nickel-containing ores in an economical and efficient manner.

These and other objects will clearly appear from the following disclosure and the claims.

SUMMARY OF THE INVENTION

Stating it broadly, the invention resides in a bioleaching and nickel recovery method for the extraction of nickel from an ore selected from the group consisting of nickel-containing lateritic ore and nickel-containing sulfidic material.

Where the ore is a nickel-containing lateritic ore, at least one micro-organism which systemically can produce an organic acid selective to the leaching of said ore is provided dispersed in an aqueous solution containing nutrients and the ore contacted by said solution.

The lateritic ore may be contacted by the leach solution in several ways. One method is to leach in situ, that is, by contacting an ore body in the ground with a micro-organism containing leach solution by drilling access holes into the ore body and allowing the solution to percolate into the ore body and stored therein for a residence time sufficient to allow the micro-organism to effect leaching of the ore. This type of leaching is time dependent in that the micro-organism containing solution is maintained in the ore body for a substantially long period of time. Another method is to employ heap leaching, agitation leaching, vat leaching or the like.

The micro-organism selected for leaching the lateritic ore is one which systemically produces an organic acid conducive to forming a complex with nickel, the micro-organism selected preferably being one that systemically produces such organic acids as Oxalic Acid, Pyruvic Acid, Citric Acid, Tartaric Acid, Malonic Acid, among others.

As illustrative of such micro-organisms, reference is made to *Aspergillus Niger* and *Penicillium Simpliccimus*. These micro-organisms are referred to as fungi which systemically secret organic acids. These fungi grow well in a glucose solution.

It has been indicated that lateritic ores are leachable with these fungi in a glucose environment. The fungi may be used to manufacture solutions containing organic acids and the organic acids can then be used in combination with inorganic acids to leach and complex nickel and cobalt from laterite.

While it is known that the foregoing fungi have potential in the bioleaching of laterites to form a metal-containing lixiviant, very few, if any, address the need of recovering nickel from the lixiviant and to separate nickel from ferric iron to provide solutions containing sufficient amount of metal, e.g., nickel, for recovery by electrolysis or other methods.

Where the ore is a nickel-containing sulfidic material, the bacterial leaching, whether by stirred reactor, heap or vat leaching, is carried out using at least one biooxidizing bacterium selective to the leaching of the sulfidic ore.

As illustrative of biooxidizing bacteria, the following list of bacteria is given: Thiobacillus thiooxidans, Thiobacillus ferroxidans, Leptospiritum species, Sulfobacillus, Thermosulfidooxidans, Sulfolobus brierleyi, Sulfolobus acidocaldarius, Sulfolobus BC and Sulfolobus sulfataricus. The Sulfolobus bacteria are particularly useful in that they can withstand temperatures over 40° C. and range up to about 80° C. or 90° C.

A preferred method for extracting the nickel from the bioleach solution and at the same time increase its concentration is by absorbing the nickel in a resin specifically selective to the absorption of nickel.

The preferred resin is one in which the active ingredient is bis-picolylamine. Such resins are produced by Dow Chemical under the trade names Dow XFS 4195, Dow XFS 4196 and Dow XFS 43084. We have found that these resins are particularly attractive not only for metal recovery but also for metal separation, such as the separation of nickel from cobalt and ferric and ferrous iron.

Conventional bioleaching for metal recovery, unlike the present invention, requires the use of low solids concentration in bioleach reactors in that too high a metal concentration in the bioleach solution adversely affects bacterial activity.

Generally speaking, the nickel-containing bioleach solution is subjected to resin absorption to selectively remove the nickel from the solution. Thus, the solution may be passed through a bed of one of the aforementioned Dow resins, e.g. XFS 4195, or the nickel extraction can be effected by employing the resin-in-pulp method which comprises grinding the ore or concentrate to a particular size smaller than the size of the resin employed (from 20 mesh to 50 mesh), blending the resin with ore and micro-organisms containing solution or concentrate, maintaining the slurry mixture in suspension for a predetermined amount of time, finally screening the coarser resin from the leach residue.

The nickel loaded resin is then stripped with a mineral acid, e.g., sulfuric acid. The amount or volume of sulfuric acid used should be sufficient to provide a concentration of nickel corresponding to about 10 gpl to 25 gpl. Electrolysis is a preferred method of recovering substantially pure nickel.

As illustrative of the invention, the following examples are given:

EXAMPLE 1

A lateritic ore analyzing 2.2% Ni, 10% Mg, 18% Fe and 30% $SiO_2$ is subjected to bioleaching by employing a micro-organism which systemically produces a carboxylic acid selective to complexing the nickel in the ore.

The ore is slurried in an aqueous nutrient solution containing the nutrients 100 gpl sugar, 1.2 gpl $NH_4H_2PO_4$, 0.5 gpl KCl, 0.5 gpl $MgSO_4 7H_2O$ in the presence of the fungi Aspergillus Niger at a pulp density of about 30% for about 120 hours. The fungus systemically produces the carboxylic acid citric acid which complexes the nickel to produce nickel citrate.

When the term "nutrient" is used with respect to the bacteria or fungi disclosed herein and other micro-organisms employed in bioleaching, it is to be understood that its meaning is well known to those skilled in the art as to the conventional nutrients employed.

Following the bioleaching of the lateritic ore, the bioleach slurry obtained is separated into a solid leach residue and an aqueous nickel containing solution.

The aqueous nickel-containing solution is thereafter contacted with a resin having the active ingredient bis-picolylamine dispersed therethrough by using any of the known methods of recovering elements from solution by ion exchange (fixed bed ion exchange, continuous counter current ion exchange, short bed reciprocating flow or the carousel method).

The foregoing method of bioleaching the ore may also be carried out by heap leaching wherein the bioleach solution is caused over a period of time to trickle gravimetrically through the interstices of the heap and the effluent thereof recycled to the heap, if necessary.

Vat leaching may also be employed wherein the ore is placed into a large vat and saturated with the bioleach solution which reacts with the nickel-containing ore over a prolonged period of time to effect dissolution of the nickel in the ore.

After a determination has been made that a substantial amount of nickel has been dissolved, the pregnant nickel solution is clarified, e.g., by filtering, and the clarified nickel solution than contacted with an ion-exchange resin specific to the absorption of nickel, the resin being one containing bis-picolylamine as the active ingredient as described hereinbefore.

EXAMPLE 2

A nickel-containing sulfidic ore or concentrate of the form pentlandite (Ni, Fe)$_9$S$_8$) in which cobalt may replace some of the nickel, and analyzing 0.5% to 12% Ni, 0.2% to 0.8% Co, 28.0 to 54% Fe, 21% to 34% S, 3.0% to 13% $SiO_2$, the balance gangue material is subjected to bioleaching by employing micro-organisms which enhance the selective solubilzation of nickel by utilizing the energy derived from the electrochemical oxidation of sulfur to sulfate and ferrous to ferric iron for their metabolic functions.

The ore is slurried in an aqueous nutrient solution containing 0.8 gpl $(NH_4)_2SO_4$, 0.4 gpl $KH_2PO_4$, and 0.16 gpl $MgSO_4.7H_2O$ in the presence of mesophilic thiobacillus type bacteria (35° C.), such as one or more of moderate thermophiles, TH5 (45° C.), and extreme thermophiles, Acidianus Brierleyi (65° C.) and Sulfolobus acidocaldarius (85° to 90°). The pH of the slurry is initially adjusted to about 1.8 with sulfuric acid. The slurry may or may not contain resin at this stage.

Following the bioleaching of the nickel-bearing sulfidic ore, the slurry is separated into a solid leach residue and an aqueous nickel-containing solution. Where resin is present in the slurry, i.e., resin in pulp (RIP), the slurry is separated into solid leach residue, a nickel-loaded resin, and a barren nickel-free solution.

Following solid-liquid separation, the resin is stripped with a mineral acid to obtain a pregnant solution containing about 10 to 25 gpl nickel such as nickel chloride, nickel sulfate and nickel nitrate, depending on the acid used.

The following nickel extraction data were experimentally obtained as follows:

| Leaching Time - days | Nickel Dissolution (%) | | Solution Concentration[2] | |
|---|---|---|---|---|
| | Nickel Dissolution | | | |
| | Nickel Ore[1] | Nickel Concentrate[2] | Nickel gram/liter | Iron gram/liter |
| 0 | 0 | 0 | 0.05 | 0.20 |
| 3 | 8 | 6 | 0.41 | 1.06 |
| 7 | 14 | 33 | 2.10 | 0.98 |
| 10 | 17 | 60 | 3.80 | 5.06 |
| 14 | 27 | 79 | 5.00 | 5.99 |
| 17 | 37 | 87 | 5.50 | 6.06 |

[1]Nickel Ore: Ni 0.59%, Co 0.17%, Fe 54%, S 34.4%, Si 1.4%
[2]Nickel Concentrate: Ni 12.3%, Co 0.17%, Fe 27%, S 21.2%, Si 6.1%

Although the present invention has been described in conjunction with preferred embodiment, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A bioleaching method of recovering nickel from an ore selected from the group consisting nickel-containing lateritic ores and nickel-containing sulfidic material which comprises:

where the ore selected is a nickel-containing lateritic ore, at least one micro-organism selective to the leaching of the lateritic ore is added to an aqueous slurry thereof maintained at a pH ranging from about 1 to 3 including a nutrient for said micro-organism;

said at least one micro-organism used in leaching said lateritic ore being a fungi that systemically produces a carboxylic acid conducive for chelating the nickel in the ore and thus produce a solution containing nickel;

where the ore selected is a nickel-containing sulfidic ore or a concentrate thereof, at least one micro-organism comprising an ore biooxidizing bacterium selective to the leaching of sulfidic ore is added to an aqueous slurry of said sulfidic ore maintained at a pH of about 1 to 3 including a nutrient for said bacterium;

the biooxidation of said ore being effected by using at least one bacterium selected from the group consisting of *Thiobacillus thiooxidans, Thiobacillus ferrooxidans,* Leptospiritum species, Sulfobacillus, *thermosulfidooxidans* or similar species, *Sulfolobus brierleyi, Sulfolobus acidocaldarius,* Sulfolobus BC and *Sulfolobus sulfataricus;* bioleaching a slurry of said selected ore for a time sufficient to effect the dissolution of said nickel in said ore and form a pregnant solution thereof and a residue;

separating said nickel solution from said residue;

contacting said separated nickel solution with an ion exchange resin containing as an active ingredient bis-picolylamine specific to the absorption of said nickel and thereby form a nickel loaded resin;

extracting said absorbed nickel from said resin by contacting said resin with a mineral acid solution;

and recovering said nickel from said mineral acid solution.

2. The method of claim 1, wherein the carboxylic acid systemically produced by said fungi bacterium is selected from the group consisting of citric, tartaric, pyruvic, oxalic, lactic, glycollic and malonic acids.

3. The method of claim 1, wherein the micro-organism used in treating the lateric ore is selected from the group consisting of the fungi *Aspergillus Niger,* Penicillium Aspergillus Sp., *Penicillium Simplicissimus* and the bacteria Enterobacter Spp., Bacillus Spp. and Achromobacter Spp.

4. The method of claim 3 wherein said fungi is *Aspergillus Niger.*

5. The method of claim 1, wherein the ion exchange resin containing bis-picolylamine as an active ingredient is added in a particulate form to the leach slurry to produce thereby a nickel loaded resin, and the particulate nickel-loaded resin then removed from the slurry by screening.

6. A bioleaching method of recovering nickel from an ore selected from the group consisting nickel-containing lateritic ores and nickel-containing sulfidic ores which comprises:

where the ore selected is a nickel-containing lateritic ore, at least one micro-organism selective to the leaching of the lateritic ore is added to an aqueous slurry thereof maintained at a pH ranging from about 1 to 3 including a nutrient for said micro-organism;

said at least one micro-organism used in leaching said lateritic ore being a fungi that systemically produces a carboxylic acid conducive for chelating the nickel in the ore and thus produce a solution containing nickel;

where the ore selected is a nickel-containing sulfidic ore or a concentrate thereof, at least one micro-organism comprising an ore biooxidizing bacterium selective to the leaching of sulfidic ore is added to an aqueous slurry of said sulfidic ore maintained at a pH of about 1 to 3 including a nutrient for said bacterium, said at least one bacterium being selected from the group consisting of *Thiobacillus thiooxidans, Thiobacillus ferrooxidans,* Leptospiritum species, Sulfobacillus, *thermosulfidooxidans* or similar species, *Sulfolobus brierleyi, Sulfolobus acidocaldarius,* Sulfolobus BC and *Sulfolobus sulfataricus;* forming a heap of said selected ore or concentrate, bioleaching said heap by passing a solution containing said microorganism gravimetrically through said heap for a time sufficient to effect the dissolution of said nickel in said ore and form a pregnant solution thereof;

collecting said pregnant nickel solution following heap leaching;

contacting said pregnant nickel solution with an ion exchange resin containing as an active ingredient bis-picolylamine specific to the absorption of said nickel and thereby form a nickel loaded resin;

extracting said absorbed nickel from said resin by contacting said resin with a mineral acid solution;

and recovering said nickel from said mineral acid solution.

7. The method of claim 6, wherein the carboxylic acid systemically produced by said fungi is selected from the group consisting of citric, tartaric, pyruvic, oxalic, lactic, glycollic and malonic acids.

8. The method of claim 6, wherein the micro-organism used in treating the lateritic ore is selected from the group consisting of the fungi *Aspergillus Niger*, Penicillium Aspergillus Sp., *Penicillium Simplicissimus* and the bacteria Enterobacter Spp., Bacillus Spp. and Achromobacter Spp.

9. The method of claim 8 wherein said fungi is *Aspergillus Niger*.

10. A bioleaching method of recovering nickel from an ore selected from the group consisting nickel-containing lateritic ores and nickel-containing sulfidic ores which comprises:

where the ore selected is a nickel-containing lateritic ore, at least one micro-organism selective to the leaching of the lateritic ore is added to an aqueous slurry thereof maintained at a pH ranging from about 1 to 3 including a nutrient for said micro-organism;

said at least one micro-organism used in leaching said lateritic ore being a fungi that systemically produces a carboxylic acid conducive for chelating the nickel in the ore and thus produce a solution containing nickel, where the ore selected is a nickel-containing sulfidic ore or a concentrate thereof, at least one micro-organism comprising an ore biooxidizing bacterium selective to the leaching of sulfidic ore is added to an aqueous slurry of said sulfidic ore maintained at a pH of about 1 to 3 including a nutrient for said bacterium which comprises:

said at least one bacterium being selected from the group consisting of *Thiobacillus thiooxidans, Thiobacillus ferrooxidans,* Leptospiritum species, Sulfobacillus, *thermosulfidooxidans* or similar species, *Sulfolobus brierleyi, Sulfolobus acidocaldarius,* Sulfolobus BC and *Sulfolobus sulfataricus;* forming a charge of said ore in the particulate state in a vat;

bioleaching said charge of ore in said vat by saturating said charge with the bioleach solution for a residence time sufficient to effect the dissolution of said nickel in said ore and form a pregnant solution thereof and a residue;

separating said pregnant nickel solution from said residue;

contacting said separated nickel solution with an ion exchange resin containing as an active ingredient bispicolylamine specific to the absorption of said nickel and thereby form a nickel loaded resin;

extracting said absorbed nickel from said resin by contacting said resin with a mineral acid solution;

and recovering said nickel from said mineral acid solution.

11. The method of claim 10, wherein the carboxylic acid systemically produced by said fungi is selected from the group consisting of citric, tartaric, pyruvic, oxalic, lactic, glycollic and malonic acids.

12. The method of claim 10, wherein the micro-organism used in treating the lateritic ore is selected from the group consisting of the fungi *Aspergillus Niger*, Penicillium Aspergillus Sp., *Penicillium Simplicissimus* and the bacteria Enterobacter Spp., Bacillus Spp. and Achromobacter Spp.

13. The method of claim 12 wherein said fungi is *Aspergillus Niger*.

14. The method of claim 10, wherein the ion exchange resin containing bis-picolylamine as an active ingredient is added in a particulate form to the pregnant nickel solution to produce thereby a nickel loaded resin, and the particulate nickel-loaded resin then removed from the slurry by screening.

* * * * *